Patented Dec. 29, 1936

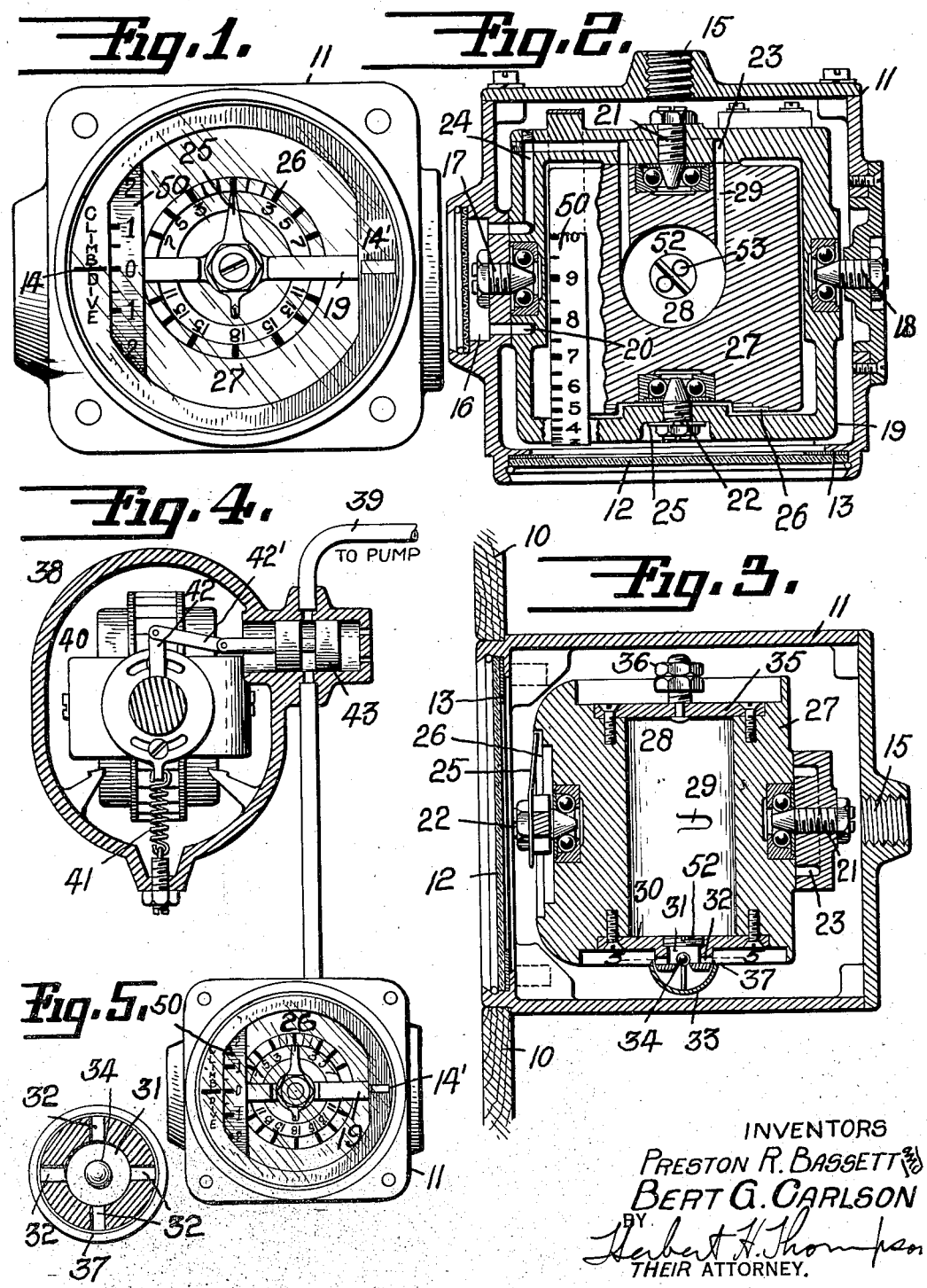

2,066,193

UNITED STATES PATENT OFFICE 2,066,193

INERTIA ATTITUDE INDICATOR FOR AIRCRAFT

Preston R. Bassett, Rockville Centre, and Bert G. Carlson, Queens Village, N. Y., assignors to Sperry Gyroscope Company, Inc., Brooklyn, N. Y., a corporation of New York Application June 29, 1934, Serial No. 733,024

2 Claims. (Cl. 33—206)

This invention relates to attitude indicators for aircraft adapted to show both pitch and bank of the craft, preferably on the same face. By our invention we provide a simple balanced mass as the sensitive element and impart gravitational control through air jets which may readily be rendered inoperative during turning of the craft. Our invention preferably comprises a non-pendulous mass mounted within a gimbal ring in such a manner that said body and gimbal ring may each revolve in a complete circle so as to permit the pilot to execute a barrel roll or loop, or both, if so desired, without disturbing the indicator. Negative air pressure may be employed for the jets, in which case the outer casing is continuously evacuated in order to draw air from the atmosphere through channels in the housing that are connected with channels in the gimbal ring which communicate with the central body or stator. The latter may be provided with a central vertical bore, the lower end of said bore being an outlet chamber provided with a plurality of openings. Said discharge end is also provided with a pendulous shutter to exert a torque on the stator, should it move away from the vertical.

The face of the instrument has the usual window through which may be seen the mask which has the lubber line and/or the climb and dive indications thereon, while the gimbal ring carries a circular band indicator having suitable graduations, which shows the number of degrees the airplane is making either in ascent or descent. The gimbal ring also carries an indicating finger which is read in connection with banking graduations on a dial on the stator itself.

Referring to the drawing which illustrates the preferred form of our invention,

Fig. 1 is a face view of the instrument.

Fig. 2 is a central horizontal view, looking down.

Fig. 3 is a vertical sectional view.

Fig. 4 is a sectional view of a turn indicator, provided with a cut-off valve to control the air supply to the attitude indicator.

Fig. 5 is a cross section on line 5—5 of Fig. 3, on an enlarged scale.

In our device there are no revolving parts to get out of order or to wear, and air is used only as an erecting force. The incoming air in this instance is used to stabilize and maintain the stator in a vertical position at all times. Of course it is understood that the attitude indicator may be used in connection with a turn indicator. In fact, in the illustration a turn indicator is attached to and controls the air to the attitude indicator by operating the piston valve so as to cut off any erecting force during acceleration.

The instrument, as shown, is adapted to be suitably placed on the instrument panel 10 with other instruments, and comprises a casing 11 having the usual window 12 with a mask 13 provided with an index 14, and suitable connecting means 15 adapted to be connected with a vacuum pump that may be driven from the engine (not shown) or otherwise. An aperture 16 is provided, through which air is drawn in. At spaced points 17 and 18 in the casing is pivoted a gimbal ring 19 which is provided with an air channel 20 about one of its pivots, that is at all times in line with slots 16' adjacent the intake aperture 16. The gimbal ring is provided with transverse pivots 21 and 22. About the former is another channel 23 that extends around said pivot. A suitable channel 24 connects the channels 20 and 23. For indicating the banking angle, there is secured to the front face of the gimbal ring an indicating finger 25 that is readable on the graduations carried by dial 26, in circular channels in the face of stator 27. For showing pitch, a circular graduated band 50 is shown secured to gimbal ring 19, the graduations being readable on index 14. An additional index 14' may also be provided which is read against the position of ring 19 as seen through the window.

Stator 27 is mounted on pivots 21 and 22 in neutral equilibrium and has a central vertical air channel 28, the latter having bore holes 29 connecting the chamber 28 with the air channel 23. To the lower end of said chamber is secured a closure plate 30 having a depending discharge opening 31 in the lower part of which is provided a plurality of small erecting ports 32. Said ports are partially closed by a pendulously mounted shutter 33 pivoted on ball 34. A threaded disc 52 may be provided at the top of aperture 31 to prevent ball 34 from falling off its seat. Holes 53 pass through said disc to admit air, the air passing outwardly through the discharge opening 31 and through the four horizontal channels or ports 32. The upper edge of the gravity shutter 34 adjacent the erecting ports 32 is provided with a knife edge 37 which intercepts an equal volume of air at each of the several ports as long as the stator remains vertical. Said shutter is made cup shaped so that no matter how great may be the centrifugal force, the shutter 34 will continue to cover one of ports 32. The upper part of said air chamber 28 is covered with a plate 35 on which may be placed the balancing weights 36.

Due to inertia and the erecting jets, the stator 27 remains at all times in a vertical position as long as no lateral acceleration is present, but the centrifugal force in making a turn will throw out the cup shaped shutter 33 so that it will uncover one or more of the erecting air ports 32, which will in turn displace the stator from its vertical position. To overcome this difficulty, we may employ a turn indicator to shut off the air supply to the jets during turning. To this end, we have shown the gimbal ring 40 of turn indicator 38 connected by arm 42 and link 42' to a piston cut-off valve 43 in the air supply line 39 to the casing 10. Valve 43 will then be closed when the airplane is starting to make a turn in either direction and will cut off the air from the attitude indicator so that any disturbance of the stator is avoided, the valve 43 not returning to the open position until the turn has ceased, when spring 41 centralizes the gimbal of the turn indicator.

Our attitude indicator provides a simple and practical device particularly adapted for use on airplanes designed for fancy flying, for instance rolls of various kinds and loops, since the instrument will instantly respond and indicate any degree of angle or position it may be desired to assume, and it has complete freedom about both horizontal axes. Our indicator will at all times indicate what angle the airplane is assuming when ascending or descending, as well as the side tilt or angle of the craft.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An indicator for airplanes comprising a casing, a gimbal ring mounted in said casing for pivotal movement, a normally stationary body mounted in said ring on an axis at right angles to said gimbal ring axis, said ring and body each being free so as to indicate the degree of roll or loop, an indicator finger mounted on said ring so as to be readable on circular bank indications carried by said central body, a mask in the window of said instrument, a second indicating member carried by said gimbal for indicating the fore and aft inclination of the plane, air ports in said body, and a cup shaped shutter pivoted on said body adjacent said air ports for governing said central body and holding the same stationary.

2. An indicator for airplanes comprising a casing, a gimbal ring mounted in said casing for pivotal movement, a normally stationary body mounted in said ring on an axis at right angles to said gimbal ring axis, said ring and body each being free so as to indicate the degree of roll or loop, an indicator finger mounted on said ring so as to be readable on circular bank indications carried by said central body, a mask in the window of said instrument, a second indicating member carried by said gimbal for indicating the fore and aft inclination of the plane, air ports in said body, and pendulous shutter means pivoted on said body adjacent said air ports to differentially control the air flow therefrom to maintain the body horizontal.

PRESTON R. BASSETT.
BERT G. CARLSON.